United States Patent
Jakobsson

(10) Patent No.: US 9,465,938 B2
(45) Date of Patent: Oct. 11, 2016

(54) INTEGRATED CIRCUIT AND METHOD FOR DETECTION OF MALICIOUS CODE IN A FIRST LEVEL INSTRUCTION CACHE

(71) Applicant: QUALCOMM Incorporated, San Diego, CA (US)

(72) Inventor: Bjorn Markus Jakobsson, Portola Valley, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/493,306

(22) Filed: Sep. 22, 2014

(65) Prior Publication Data

US 2016/0085968 A1 Mar. 24, 2016

(51) Int. Cl.
*G06F 12/14* (2006.01)
*G06F 21/56* (2013.01)
*G06F 12/08* (2016.01)

(52) U.S. Cl.
CPC ......... *G06F 21/563* (2013.01); *G06F 12/0811* (2013.01); *G06F 12/0875* (2013.01); *G06F 12/0897* (2013.01); *G06F 12/14* (2013.01); G06F 2212/1052 (2013.01); G06F 2221/033 (2013.01)

(58) Field of Classification Search
CPC .................................................... G06F 21/563
USPC .......................................................... 726/23
See application file for complete search history.

(56) References Cited

U.S. PATENT DOCUMENTS

| | | | |
|---|---|---|---|
| 7,130,981 B1 * | 10/2006 | Nachenberg .......... | G06F 21/564 711/111 |
| 7,590,813 B1 * | 9/2009 | Szor .................... | G06F 12/0804 711/163 |
| 2011/0197256 A1 | 8/2011 | Sharkey et al. | |
| 2013/0024936 A1 | 1/2013 | Jakobsson et al. | |
| 2013/0061322 A1 | 3/2013 | Sethumadhavan et al. | |
| 2013/0117843 A1 * | 5/2013 | Komaromy ............. | G06F 21/52 726/22 |
| 2014/0082370 A1 | 3/2014 | Fernandez Gutierrez | |

OTHER PUBLICATIONS

Aciicmez O., et al., "New Results on Instruction Cache Attacks," Cryptographic Hardware and Embedded Systems (CHES), Aug. 2010, pp. 110-124.

(Continued)

*Primary Examiner* — Peter Shaw
(74) *Attorney, Agent, or Firm* — Loza & Loza, LLP

(57) ABSTRACT

An integrated circuit may comprise a processor, a first level instruction cache having a first storage capacity, and a second level cache having a second storage capacity that is larger than the first storage capacity. The first level instruction cache is configured to store a subset of instructions stored in the second level cache. The second level cache is configured to store a subset of data and instructions stored in an external memory. The processor executes an inner loop of a detection routine and monitors an execution time of the inner loop to detect malicious code in the first level instruction cache. A total number of detection routine instructions is larger than the first storage capacity. The inner loop requires fetching of detection routine instructions from the second level cache, and an execution number of instructions executed during execution of the inner loop is smaller than the first storage capacity.

18 Claims, 4 Drawing Sheets

(56) References Cited

OTHER PUBLICATIONS

Yarom Y., et al., "Flush+Reload: a high resolution, low noise, L3 cache side-channel attack," Cryptology ePrint Archive, Report 2013/448, Jul. 2013, URL: http://eprint.iacr.org/2013/448.pdf, pp. 1-9.
International Search Report and Written Opinion—PCT/US2015/046880—ISA/EPO—Nov. 5, 2015.
Jakobsson M., et al., "Retroactive Detection of Malware With Applications to Mobile Platforms", USENIX Jul. 13, 2010 (Jul. 13, 2010), pp. 1-6, XP061010231, [retrieved on Jul. 13, 2010] Chapter 3 Overview Chapter 6 Our solution.
Sayin C: "Obfuscating Malware through Cache Memory Architecture Features", Jun. 1, 2014 (Jun. 1, 2014), pp. 1-102, XP055222885, Retrieved from the Internet: URL: http://brage.bibsys.no/xmlui/bitstream/id/212057/CSayin.pdf [retrieved on Oct. 22, 2015] p. 31-p. 39.

* cited by examiner

INTEGRATED CIRCUIT AND METHOD FOR DETECTION OF MALICIOUS CODE IN A FIRST LEVEL INSTRUCTION CACHE

BACKGROUND

1. Field

The present invention relates generally to detecting malicious code associated with a do-not-cache attack.

2. Background

Many computational environments include instructions to fetch one or more instructions directly from RAM. Such instructions are not stored in second level (L2) cache, but instead are directly copied to smaller and faster level one (L1) instruction cache. Normally, bypassing the L2 cache is a benevolent operation. However, the ability to run code without accessing the L2 cache may allow an adversary to replace innocuous code that uses the L2 cache with malicious/corrupt code that does not use the L2 cache, without this being discovered. For example, the malicious code may hide its presence from scanning/detection software if the entire malicious code fits in the L1 cache.

There is therefore a need for an ability to detect malicious code hiding in a first level instruction cache.

SUMMARY

An aspect of the present invention may reside in an integrated circuit, comprising: a processor, a first level instruction cache having a first storage capacity, and a second level cache having a second storage capacity that is larger than the first storage capacity. The first level instruction cache is coupled between the processor and the second level cache, and is configured to store a subset of instructions stored in the second level cache. The second level cache is coupled between the first level instruction cache and an external memory, and is configured to store a subset of data and instructions stored in the external memory. The processor is configured to execute an inner loop of a detection routine and monitor an execution time of the inner loop to detect malicious code in the first level instruction cache. A total number of detection routine instructions is larger than the first storage capacity. The inner loop, during execution, requires fetching of detection routine instructions from the second level cache, and an execution number of instructions executed during execution of the inner loop is smaller than the first storage capacity.

In more detailed aspects of the invention, the execution number may be significantly smaller than the first storage capacity. The detection routine instructions may comprise a family of similar functions, and at least two functions, of the family of similar functions, may be different. The inner loop of the detection routine, during execution, may include a selection of at least one detection routine instruction based on at least one selection input not known prior to the execution of the detection routine.

Another aspect of the invention may reside in a method, comprising: executing, by a processor, an inner loop of a detection routine, wherein a total number of detection routine instructions is larger than a first storage capacity of a first level instruction cache; and while the inner loop is executing, fetching detection routine instructions from a second level cache having a second storage capacity for storing a subset of data and instructions stored in an external memory, wherein an execution number of instructions executed during execution of the inner loop is smaller than the first storage capacity; and monitoring, by the processor, an execution time of the inner loop to detect malicious code in the first level instruction cache.

Another aspect of the invention may reside in an integrated circuit, comprising: means for executing an inner loop of a detection routine, wherein a total number of detection routine instructions is larger than the a first storage capacity of a first level instruction cache; means for fetching detection routine instructions, while the inner loop is executing, from a second level cache having a second storage capacity for storing a subset of data and instructions stored in an external memory, wherein an execution number of instructions executed during execution of the inner loop is smaller than the first storage capacity; and means for monitoring an execution time of the inner loop to detect malicious code in the first level instruction cache.

Another aspect of the invention may reside in a computer program product, comprising: computer readable medium, comprising: code for causing a computer to execute an inner loop of a detection routine, wherein a total number of detection routine instructions is larger than a first storage capacity of a first level instruction cache, wherein the inner loop, during execution, requires fetching of detection routine instructions from a second level cache having a second storage capacity for storing a subset of data and instructions stored in an external memory, and wherein an execution number of instructions executed during execution of the inner loop is smaller than the first storage capacity; and code for causing the computer to monitor an execution time of the inner loop to detect malicious code in the first level instruction cache.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 2:
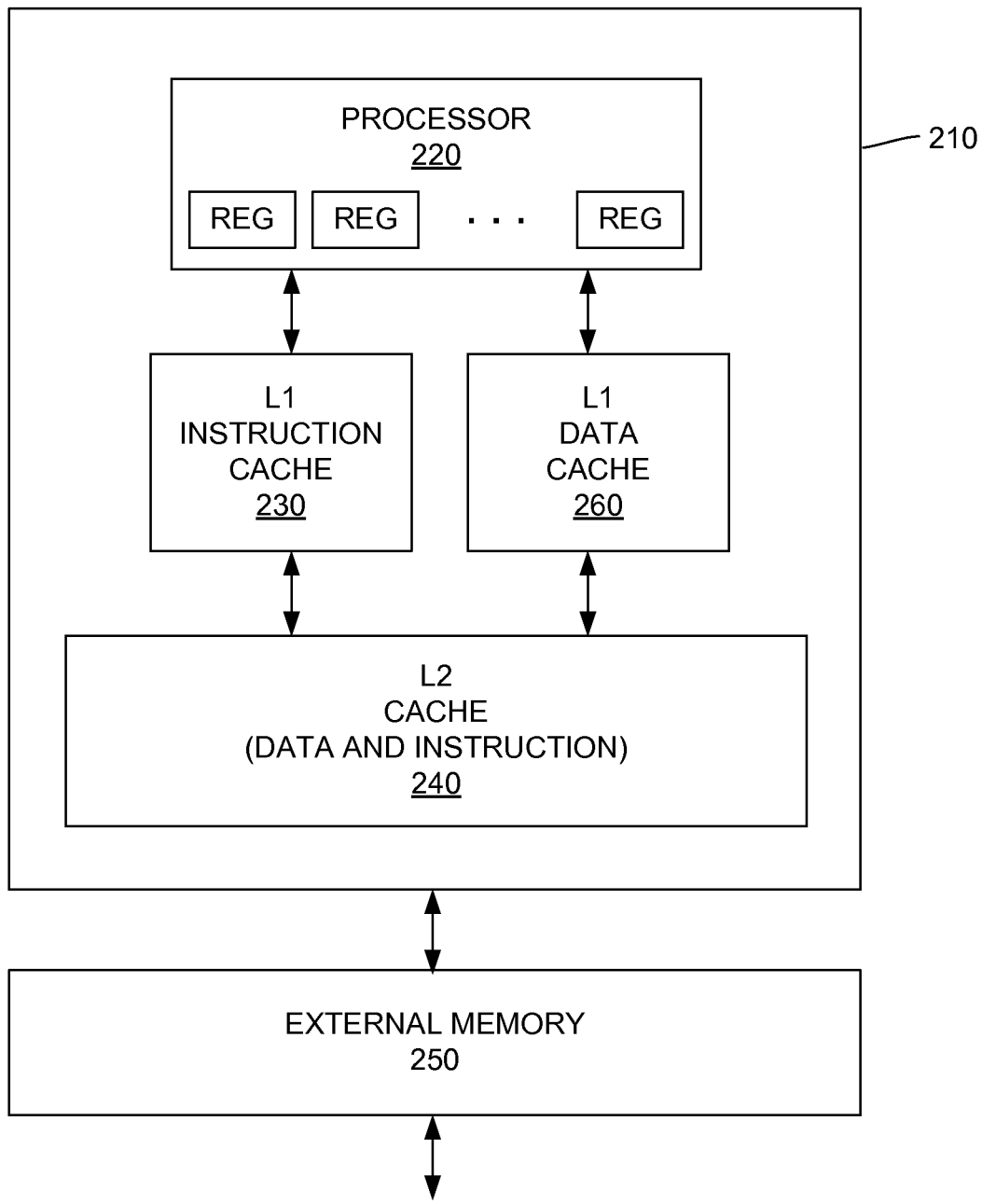
FIG. 2 is a block diagram of an integrated circuit for implementing a technique for detecting malicious code in a first level instruction cache, according to an aspect of the present invention.
Figure 3:
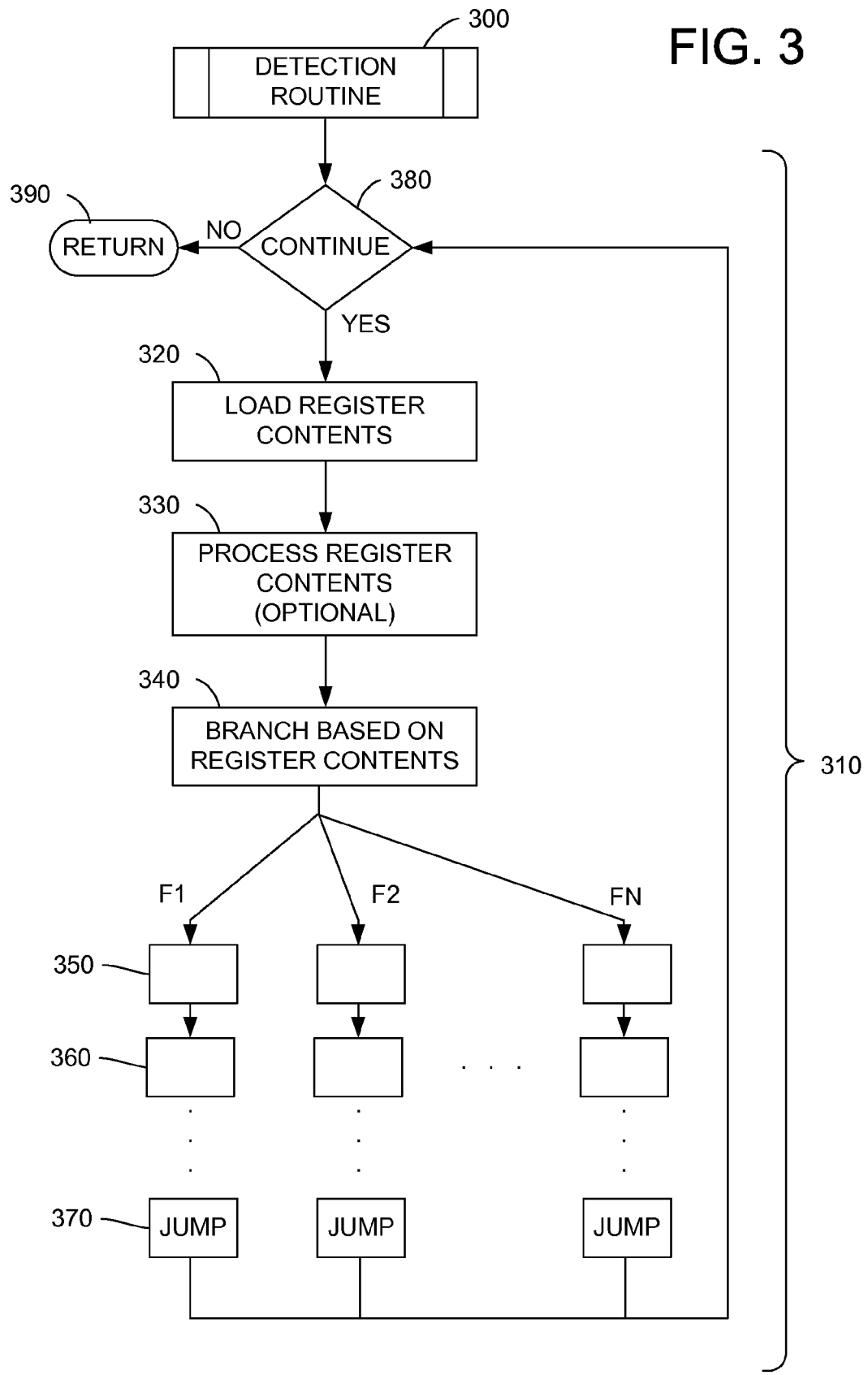
FIG. 3 is a flow diagram of a detection routine, according to an aspect of the present invention.

With reference to FIGS. 2 and 3, an aspect of the present invention may reside in an integrated circuit 210, comprising: a processor 220, a first level instruction cache 230 having a first storage capacity, and a second level cache 240 having a second storage capacity that is larger than the first storage capacity. The first level instruction cache is coupled between the processor and the second level cache, and is configured to store a subset of instructions stored in the second level cache. The second level cache is coupled between the first level instruction cache and an external memory 250, and is configured to store a subset of data and instructions stored in the external memory. The processor is configured to execute an inner loop 310 of a detection routine 300 and monitor an execution time of the inner loop to detect malicious code in the first level instruction cache. A total number of detection routine instructions is larger than the first storage capacity. The inner loop, during execution, requires fetching of detection routine instructions from the second level cache, and an execution number of instructions executed during execution of the inner loop is smaller than the first storage capacity.

In more detailed aspects of the invention, the execution number may be significantly smaller than the first storage capacity. The detection routine instructions may comprise a family of similar functions, and at least two functions, of the family of similar functions, may be different. The inner loop 310 of the detection routine 300, during execution, may include a selection of at least one detection routine instruction based on at least one selection input not known prior to the execution of the detection routine. The first level instruction cache may comprise 4 kilobytes, and the execution number may comprise 16.

Figure 1:
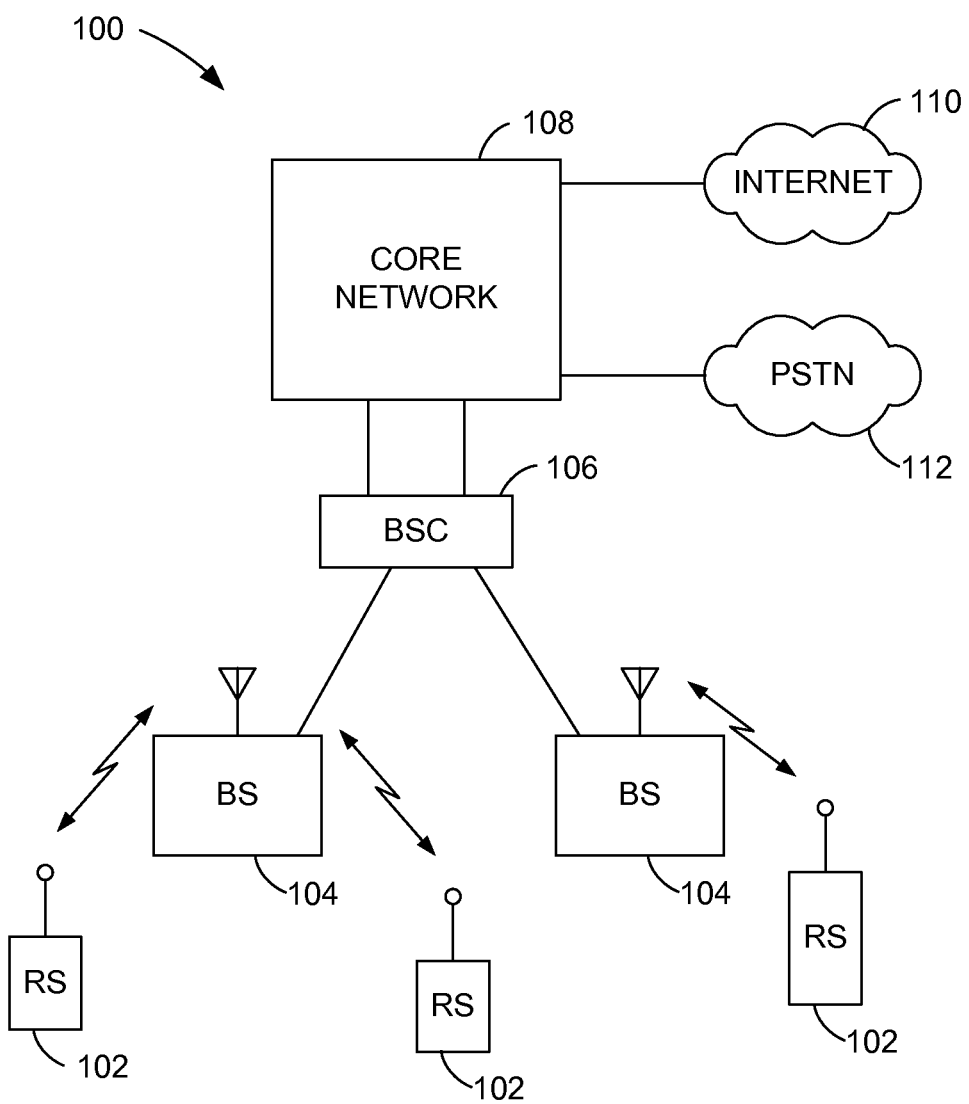
FIG. 1 is a block diagram of an example of a wireless communication system.
Figure 5:
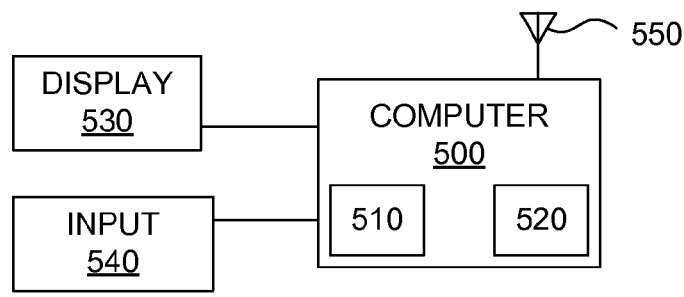
FIG. 5 is a block diagram of a computer including a processor and a memory.

With further reference to FIGS. 1 and 5, a remote station 102 may comprise a computer 500 that includes a processor 510 (for example, the processor 220 in the integrated circuit 210), a storage medium 520 (such as the memory 250 and/or a disk drive), a display 530, and an input such as a keypad 540, and a wireless connection 550 (such as a Wi-Fi connection and/or cellular connection).

Figure 4:
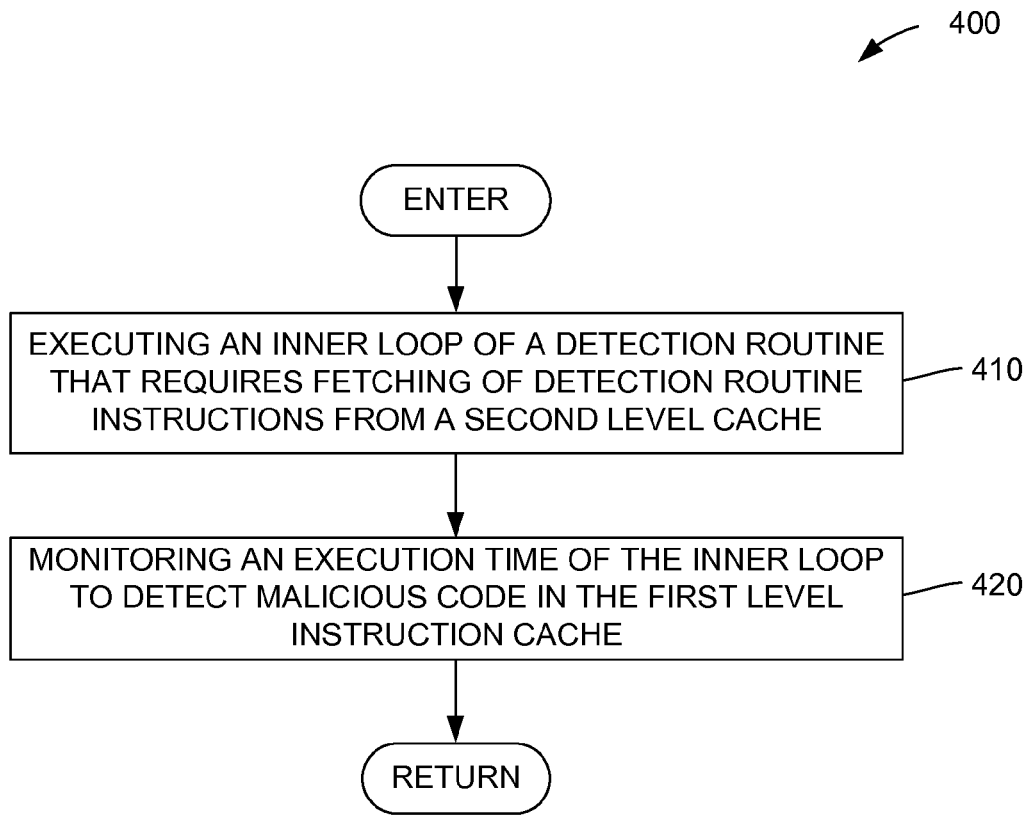
FIG. 4 is a flow diagram of the method for detecting malicious code in a first level instruction cache, according to an aspect of the present invention.

With further reference to FIG. 4, another aspect of the invention may reside in a method 400, comprising: executing, by a processor 220, an inner loop 310 of a detection routine 300 (step 410). A total number of detection routine instructions is larger than a first storage capacity of a first level instruction cache 230. While the inner loop is executing, detection routine instructions are fetched from a second level cache 240 having a second storage capacity for storing a subset of data and instructions stored in an external memory 250. An execution number of instructions executed during execution of the inner loop is smaller than the first storage capacity. The method further comprises monitoring, by the processor, an execution time of the inner loop to detect malicious code in the first level instruction cache (step 420).

Another aspect of the invention may reside in an integrated circuit 210, comprising: means (e.g., 220, 510) for executing an inner loop 310 of a detection routine 300, wherein a total number of detection routine instructions is larger than the a first storage capacity of a first level instruction cache 230; means (e.g., 220, 510) for fetching detection routine instructions, while the inner loop is executing, from a second level cache 240 having a second storage capacity for storing a subset of data and instructions stored in an external memory 250, and wherein an execution number of instructions executed during execution of the inner loop is smaller than the first storage capacity; and means (e.g., 220, 510) for monitoring an execution time of the inner loop to detect malicious code in the first level instruction cache.

Another aspect of the invention may reside in a computer program product, comprising: computer readable medium (e.g., 250, 520), comprising: code for causing a computer to execute an inner loop 310 of a detection routine 300, wherein a total number of detection routine instructions is larger than a first storage capacity of a first level instruction cache 230, wherein the inner loop, during execution, requires fetching of detection routine instructions from a second level cache 240 having a second storage capacity for storing a subset of data and instructions stored in an external memory 250, and wherein an execution number of instructions executed during execution of the inner loop is smaller than the first storage capacity; and code for causing the computer to monitor an execution time of the inner loop to detect malicious code in the first level instruction cache.

An aspect of the invention involves using benevolent/honest code, i.e., detection routine 300, which prevents the malicious no-cache code from fitting in the L1 cache 230, and that executes quickly (e.g., 1.6 milliseconds). Executing quickly is desirable for software-based attestation (SBA), both for usability and security. The benevolent code has the following features: 1) An inner loop 310 of the benevolent code is large meaning it does not fit in the L1 cache, and therefore, to run the inner loop requires fetching of code from either the L2 cache 240 or RAM/secondary storage; and 2) the number of instructions executed for one iteration of the inner loop is substantially smaller than the number of instructions fitting in the L1 cache.

This is achieved by using extensive branching with benevolent code, where some portion of the branches cause an L1 cache miss because all of the code that could be branched to within the inner loop 310 cannot fit in the L1 cache 230. The benevolent code cannot be compressed or represented in a manner that fits in the L1 cache as long as the different branches contain sufficiently different code, such as different operations or offsets, without causing a delay associated with the decompression. Therefore, malicious code attempting to perform the same computational task will either take measurably longer due to decompression, or take longer to execute due to cache misses. This is because the benevolent code can be stored in both the L1 and L2 cache, where things are loaded from the L2 to the L1 when there is an L1 cache miss; however, the malicious code wishes to avoid using the L2, and any L1 cache miss will therefore either result in decompression (which takes a long time) or fetching data from DRAM or other slow storage (which also takes a long time.) Combining this structure with other pipelining/fetch defeating structures assures that a do-not-cache attack cannot be carried out without being detected.

An example of benevolent code may include a family of similar (or equivalent) but different functions (XOR, bit rotation, add and swap, etc.) that may require 6 Kbytes whereas the capacity of the L1 instruction cache may be 4 Kbytes, i.e., the benevolent code may be about 150% the size of the L1 instruction cache. The benevolent code may perform, for example, only 16 steps, but at each step it unpredictably selects a new function (e.g., F1, F2 . . . FN) based on conditions 1, 2 . . . N, which are not known until during execution. Thus, at each step, there is a change of a cache miss, which cannot be predicted/avoided by malicious no-cache code. For the benevolent code, the cache miss would cause a minor delay as the code for the new function is accessed (or paged) from L2 cache. However, the cache miss in the presence of malicious no-cache code would cause an access to external memory 250 (e.g., RAM or secondary storage such as a disk drive or the like), which takes a much longer time to access. Thus, the delay due to the much longer execution time allows detection of the presence of the malicious code.

Each function may comprise an operation and an operand, such as XOR 3076 or AND Z. The level one cache may also include a L data cache 260.

The benevolent code of the detection routine 300 may also include common instructions to load a register with contents known at runtime (step 320). Optionally, the register contents may include a step to process the register contents (step 330). The common code may include a jump instruction that branches to a position or code path based on the register contents or state (step 340). Each code path may comprise a sequence of another 6 bytes (350, 360, . . . ), including a jump 370 to the beginning of the common portion. The common portion may include continue step (step 380) to a branch out of the loop 310 or return upon completion (step 390). Thus, in this example, there may be 1000 branching paths, each one 6 bytes long, resulting in about 6 Kbytes for the detection routine. The common code may comprise about 10 bytes.

The disclosed technology counters an attack that bypasses the L2 cache, and directly applies to the detection of active malware, including active mobile malware. As an example, malicious code residing in memory 250 and L1 instruction cache 230, but not in the L2 cache 240, may calculate a checksum on innocuous or honest code residing in the L2 cache, and return that checksum to avoid detection. By forcing the malicious code to reside in the L2 cache (detected from checksum) or in memory causing measurable delays if it runs (detected from execution time), then the malicious code cannot hide.

The previous description also applies to a cache hierarchy with more than two levels, or more generally, to a memory hierarchy with more than three levels, and wherein the benevolent code is configured to use a subset of the available levels, and the goal is to detect if malicious code uses another set of available levels.

With reference to FIG. 1, a wireless remote station (RS) 102 may communicate with one or more base stations (BS) 104 of a wireless communication system 100. The RS may be a mobile station. The wireless communication system 100 may further include one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose process or may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both non-transitory computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An integrated circuit for detection of malicious code hiding in a first level instruction cache, comprising: a processor; the first level instruction cache having a first storage capacity; and a second level cache having a second storage capacity that is larger than the first storage capacity; the first level instruction cache is coupled between the processor and the second level cache, the first level instruction cache is configured to store a subset of instructions stored in the second level cache, the second level cache is coupled between the first level instruction cache and an external memory, the second level cache is configured to store a subset of data and instructions stored in the external memory, and the processor is configured to execute an inner loop of a detection routine, monitor an execution time of the inner loop, and compare the monitored execution time with an execution time threshold to detect malicious code hiding in the first level instruction cache, wherein code for a total number of detection routine instructions is larger than the first storage capacity, wherein the inner loop, during execution, requires fetching of detection routine instructions from the second level cache, and wherein code for an execution number of instructions executed during execution of the inner loop is smaller than the first storage capacity based on executing selected code of the detection routine instructions.

2. The integrated circuit of claim 1, wherein the code for the execution number of instructions comprises 16 steps and the first storage capacity is 4 kilobytes.

3. The integrated circuit of claim 1, wherein the detection routine instructions comprise a family of similar functions, and wherein at least two functions, of the family of similar functions, are different.

4. The integrated circuit of claim 1, wherein the inner loop of the detection routine, during execution, includes a selection of at least one detection routine instruction based on at least one selection input not known prior to the execution of the detection routine.

5. A method for detection of malicious code hiding in a first level instruction cache, comprising: executing, by a processor, an inner loop of a detection routine, wherein code for a total number of detection routine instructions is larger than a first storage capacity of the first level instruction cache; and while the inner loop is executing, fetching detection routine instructions from a second level cache having a second storage capacity for storing a subset of data and instructions stored in an external memory, wherein code for an execution number of instructions executed during execution of the inner loop is smaller than the first storage capacity based on executing selected code of the detection routine instructions; and monitoring, by the processor, an execution time of the inner loop and comparing the monitored execution time with an execution time threshold to detect malicious code hiding in the first level instruction cache.

6. The method of claim 5, wherein the code for the execution number of instructions comprises 16 steps and the first storage capacity is 4 kilobytes.

7. The method of claim 5, wherein the detection routine instructions comprise a family of similar functions, and wherein at least two functions, of the family of similar functions, are different.

8. The method of claim 5, wherein the inner loop of the detection routine, when executed, include a selection of at least one detection routine instruction based on at least one selection input not known prior to the execution of the detection routine.

9. The method of claim 5, wherein the second storage capacity is larger than the first storage capacity and the first level instruction cache stores a subset of instructions stored in the second level cache, wherein the first level instruction cache is coupled between the processor and the second level cache and second level cache is coupled between the first level instruction cache and the external memory.

10. An integrated circuit for detection of malicious code hiding in a first level instruction cache, comprising: means for executing an inner loop of a detection routine, wherein code for a total number of detection routine instructions is larger than the a first storage capacity of the first level instruction cache; means for fetching detection routine instructions, while the inner loop is executing, from a second level cache having a second storage capacity for storing a subset of data and instructions stored in an external memory, wherein code for an execution number of instructions executed during execution of the inner loop is smaller than the first storage capacity based on executing selected code of the detection routine instructions; and means for monitoring an execution time of the inner loop and comparing the monitored execution time with an execution time threshold to detect malicious code hiding in the first level instruction cache.

11. The integrated circuit of claim 10, wherein the code for the execution number of instructions is significantly smaller than the first storage capacity.

12. The integrated circuit of claim 10, wherein the detection routine instructions comprise a family of similar functions, and wherein at least two functions, of the family of similar functions, are different.

13. The integrated circuit of claim 10, wherein the inner loop of the detection routine, during execution, includes a selection of at least one detection routine instruction based on at least one selection input not known prior to the execution of the detection routine.

14. The integrated circuit of claim 10, wherein the second storage capacity is larger than the first storage capacity and the first level instruction cache stores a subset of instructions stored in the second level cache.

15. A non-transitory computer readable medium for detection of malicious code hiding in a first level instruction cache, comprising: code for causing a computer to execute an inner loop of a detection routine, wherein code for a total number of detection routine instructions is larger than a first storage capacity of a first level instruction cache, wherein the inner loop, during execution, requires fetching of detection routine instructions from a second level cache having a second storage capacity for storing a subset of data and instructions stored in an external memory, and wherein code for an execution number of instructions executed during execution of the inner loop is smaller than the first storage capacity based on executing selected code of the detection routine instructions; and code for causing the computer to monitor an execution time of the inner loop and compare the monitored execution time with an execution time threshold to detect malicious code hiding in the first level instruction cache.

16. The non-transitory computer-readable medium of claim 15, wherein code for the execution number of instructions comprises 16 steps and the first storage capacity is 4 kilobytes.

17. The non-transitory computer-readable medium of claim 15, wherein the inner loop of the detection routine, when executed, includes a selection of at least one detection routine instruction based on at least one selection input not known prior to the execution of the detection routine.

18. The non-transitory computer-readable medium of claim 15, wherein the second storage capacity is larger than the first storage capacity and the first level instruction cache stores a subset of instructions stored in the second level cache, wherein the first level instruction cache is coupled between a processor and the second level cache and second level cache is coupled between the first level instruction cache and the external memory.

\* \* \* \* \*